(12) United States Patent
Mathew et al.

(10) Patent No.: US 12,449,832 B2
(45) Date of Patent: Oct. 21, 2025

(54) CONTROL CIRCUITRY FOR PARALLEL-OPERATING VOLTAGE REGULATORS

(71) Applicant: Texas Instruments Incorporated, Dallas, TX (US)

(72) Inventors: Rinu Mathew, Bangalore (IN); Venkatesh Kadlimatti, Bangalore (IN); Harikrishna Parthasarathy, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 116 days.

(21) Appl. No.: 18/371,537

(22) Filed: Sep. 22, 2023

(65) Prior Publication Data

US 2025/0103077 A1     Mar. 27, 2025

(51) Int. Cl.
  *H02M 1/00*     (2007.01)
  *G05F 1/575*   (2006.01)
  *G05F 3/26*     (2006.01)
  *H02M 3/158*   (2006.01)

(52) U.S. Cl.
  CPC ............. *G05F 1/575* (2013.01); *G05F 3/262* (2013.01); *H02M 1/0045* (2021.05); *H02M 3/158* (2013.01)

(58) Field of Classification Search
  CPC ............ H02M 1/0003; H02M 1/0045; H02M 1/0054; H02M 3/02; H02M 3/06; H02M 3/07; H02M 3/156; H02M 3/158; H02M 3/1584; H02M 3/1586; G05F 1/56; G05F 1/561; G05F 1/562; G05F 1/575;
  (Continued)

(56) References Cited

U.S. PATENT DOCUMENTS 10,886,851 B1 *   1/2021   Fletcher .............. H02M 3/156
2005/0189931 A1   9/2005   Ishino
(Continued)

FOREIGN PATENT DOCUMENTS

JP        2009177909 A     8/2009
KR     1020130029622 A     3/2013

OTHER PUBLICATIONS

International Search report for PCT/US2023/086417, dated Jun. 12, 2024.

(Continued)

*Primary Examiner* — Thienvu V Tran
*Assistant Examiner* — Shahzeb K Ahmad
(74) *Attorney, Agent, or Firm* — Xianghui Huang; Frank D. Cimino (57) ABSTRACT

A power supply system may include multiple DC-to-DC (direct current) voltage regulators coupled in parallel to a load, and control circuitry to control the parallel-operating regulators. The control circuitry may include a first share control circuit, a second share control circuit, and a voltage regulation circuit. The first and second share control circuits may operate together with the voltage regulation circuit to control, respectively, the parallel-operating regulators to regulate a common output voltage. Additionally, first and second share control circuits may operate together with the voltage regulation circuit to control respective share of the load current by the parallel-operating regulators.

20 Claims, 7 Drawing Sheets

(58) Field of Classification Search
CPC ... G05F 1/577; G05F 1/59; G05F 1/61; G05F 1/613; G05F 3/26; G05F 3/262
See application file for complete search history.

(56) References Cited

U.S. PATENT DOCUMENTS

2006/0261797 A1* 11/2006 Man ................ G05F 1/575
 323/314
2010/0026250 A1*  2/2010 Petty ............... H02M 3/156
 323/271
2013/0314063 A1* 11/2013 Napravnik ........ G05F 1/56
 323/273
2015/0286231 A1* 10/2015 Gerber ............. G05F 1/565
 323/281
2016/0043539 A1*  2/2016 Mallala ............ G05F 1/573
 361/18
2017/0085176 A1   3/2017 Mathe
2021/0333812 A1* 10/2021 Liu ................ G05F 1/462
2023/0152828 A1   5/2023 Mathew et al.
2023/0168700 A1   6/2023 Mathew et al.
2023/0253881 A1   8/2023 Khurana et al.

OTHER PUBLICATIONS

Machine Translation for KR20130029622A.
Machine Translation for JP2009177909A.

* cited by examiner

CONTROL CIRCUITRY FOR PARALLEL-OPERATING VOLTAGE REGULATORS

BACKGROUND

A DC (direct current) to DC voltage regulator receives a DC input voltage and converts it to a DC output voltage to drive a load. Generally, the output voltage may have a different value than the input voltage to meet requirements of the load. Additionally, the input voltage, e.g., one from a power source such as a battery, may have a fluctuating value. The voltage regulator may regulate the output voltage to a substantially stable value. A linear regulator, such as a low dropout (LDO) voltage regulator (hereinafter "LDO regulator") may include a semiconductor device and operate the semiconductor device as a variable resistor. The LDO regulator may receive an input voltage and control the voltage drop across the semiconductor device so as to regulate an output voltage. By comparison, a DC to DC switching voltage regulator (hereinafter "DC/DC regulator") may operate one or more semiconductor devices as switches. The DC/DC regulator may receive an input voltage and generate a "modulated" output voltage. By controlling switching of the semiconductor devices, the DC/DC voltage regulator may regulate value of the output voltage. Sometimes multiple voltage regulators may be used in parallel to drive a load. The parallel configuration may cause more operating complexity. Thus, it is desired to have techniques to control load current sharing between the parallel-operating voltage regulators.

SUMMARY

This disclosure describes circuitry for controlling parallel-operating voltage regulators, such as an LDO regulator in parallel with a DC/DC regulator or another LDO regulator. The circuitry aims to ensure seamless load sharing between the parallel-operating voltage regulators as a load current increases. In some examples, a power supply system may include multiple DC-to-DC voltage regulators coupled in parallel to regulate an output voltage and provide a load current to a load. The power supply system may include control circuitry to control operations of the parallel-operating voltage regulators. In some examples, the control circuitry may include a first share control circuit, a second share control circuit, and a voltage regulation circuit. The first share control circuit may include a first resistor and a first transistor coupled in series between an input terminal (that is configured to receive an input voltage) and a current source. A first control terminal may be located between the first resistor and the first transistor, and a first control signal may be generated based on a first voltage across the first resistor to control share of the load current by the LDO regulator. The second share control circuit may include a second resistor and a second transistor coupled in series the input terminal (that is configured to receive an input voltage) and the current source. A second control terminal may be located between the second resistor and the second transistor, and a second control signal may be generated based on a second voltage across the second resistor to control share of the load current by the DC/DC regulator. The voltage regulation circuit may include a differential circuit and a third transistor. The differential circuit may generate an output signal, at an output terminal of the differential circuit, based on a difference between a reference voltage and a feedback voltage representative of the output voltage of the voltage regulators to the load. The third transistor may be coupled to the output terminal of the differential circuit, the first transistor, the second transistor, and the current source. The third transistor may control respective currents flowing through the first and second resistors (of the first and second share control circuits) so as to control the first and second control signals for the LDO and DC/DC regulators.

In some examples, the control circuitry may include a first saturation prevention circuit. The first saturation prevention circuit may be coupled between the input terminal of the control circuitry and the output terminal of the differential circuit. The first saturation prevention circuit may include a transistor that may be turned on to cause current flowing into the output terminal of the differential circuit, when the output signal of the differential circuit becomes saturated, e.g., towards a negative limit. In some examples, the first saturation prevention circuit may further include a delay circuit, which may delay the activation of the first saturation prevention circuit.

In some examples, the control circuitry may include a second saturation prevention circuit. The second saturation prevention circuit may be coupled between the output terminal of the differential circuit and a current source. The second saturation prevention circuit may include a transistor that may be turned on to cause current flowing out of the output terminal of the differential circuit, when the output signal of the differential circuit becomes saturated, e.g., towards a positive limit.

These and other features and implementations will be better understood from the following detailed description with reference to the accompanying drawings.

The same reference numbers or other reference designators are used in the drawings to designate the same or similar (functionally and/or functionally) features. Specific examples are described below in detail with reference to the accompanying figures. These examples are not intended to be limiting. In the drawings, corresponding numerals and symbols generally refer to corresponding parts unless otherwise indicated. The objects depicted in the drawings are not necessarily drawn to scale.

DETAILED DESCRIPTION

Figure 1:
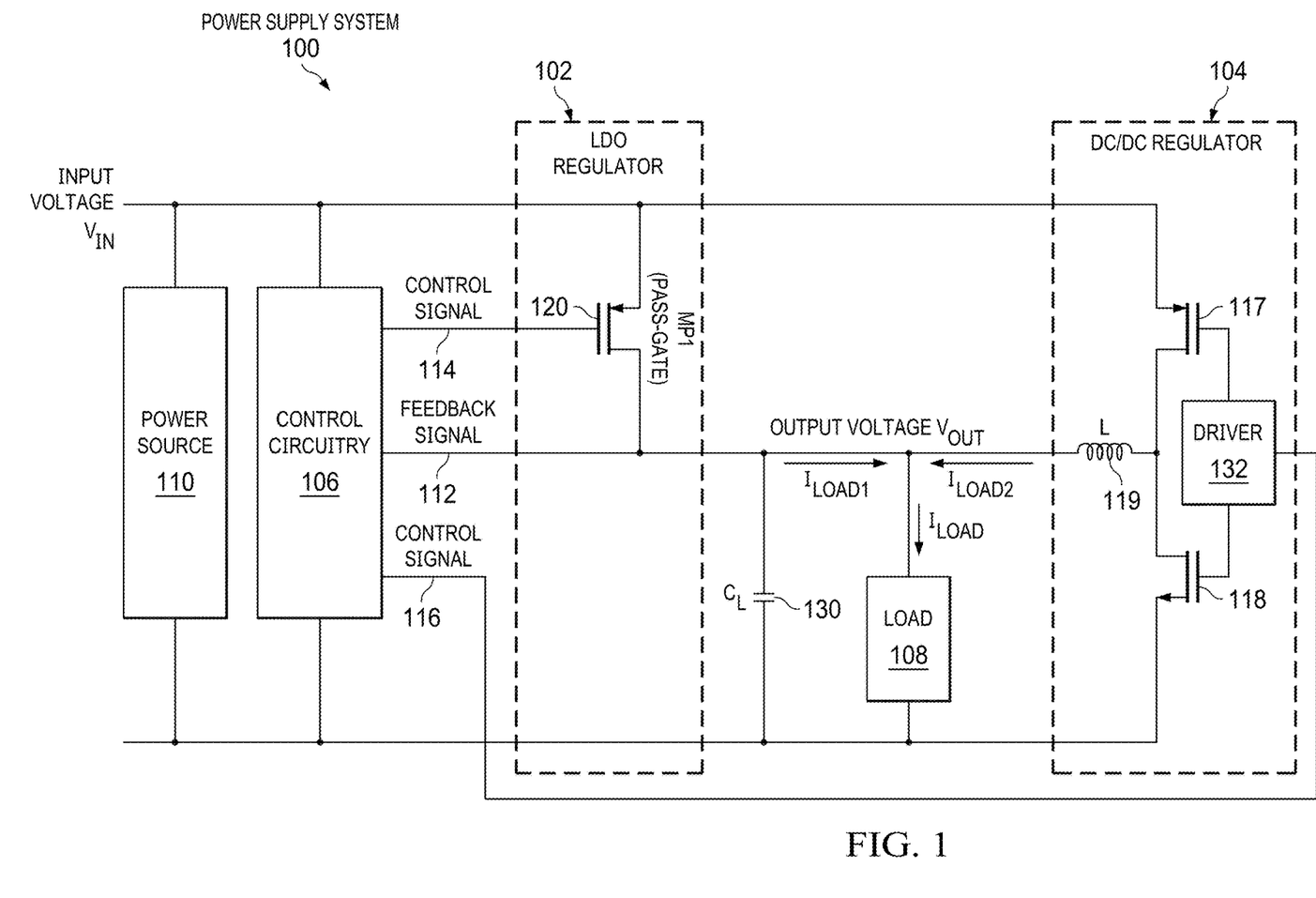
FIG. 1 is a block diagram of a power supply system in accordance with some examples.

FIG. 1 is a block diagram of a power supply system in accordance with some examples. In some examples, power supply system 100 may provide regulated output voltage $V_{OUT}$ to load 108. Load 108 may be load(s) in a variety of applications, for example, electronic component(s) used in Bluetooth, Bluetooth low energy (BLE), Internet of Things (IOT), or other types of wired or wireless communications. In some examples, power supply system 100 may include multiple voltage regulators, for example, a linear regulator such as LDO regulator 102 and DC/DC regulator 104 (or another LDO regulator). LDO regulator 102 and DC/DC regulator 104 may be coupled in parallel to regulate an output voltage and provide a load current $I_{load}$ to load 108. For example, as shown, LDO regulator may include at least one semiconductor device (also called pass gate), such as p-channel metal-oxide-semiconductor field-effect transistor (hereinafter "pFET") 120, which may be coupled in series with load 108 between an input terminal and a reference terminal coupled to a voltage reference such as ground. DC/DC regulator 104, such as a buck converter, may include one or more semiconductor devices, such as pFET 117 and n-channel metal-oxide-semiconductor field-effect transistor (hereinafter "nFET") 118 driven by gate driver 132, and inductor L 119. pFET 117 and nFET 118 may be coupled in series between the input terminal and the reference terminal, and inductor L 119 may be coupled to a node in-between pFET 117 and nFET 118. Both LDO regulator 102 and DC/DC regulator 104 may receive an input voltage Vin at the input terminal from power source 110, such as a battery or other types of power sources. The output terminal of LDO regulator 102 may be coupled in parallel with the output terminal of DC/DC regulator 104 to regulate a common output voltage $V_{OUT}$ and provide a load current $I_{load}$ to load 108. For example, LDO 102 may control resistance of pFET 120 to adjust the voltage drop across pFET 120 so as to regulate output voltage $V_{OUT}$. DC/DC regulator 104 may control switching of pFET 117 and nFET 118 to generate regulated output voltage $V_{OUT}$. The currents provided by LDO regulator 102 (e.g., $I_{load1}$) and DC/DC regulator 104 (e.g., $I_{load2}$) together may form load current $I_{load}$ to load 108. In addition, as shown, in some examples, there may be one or more output filter capacitors such as CL 130 coupled to load 108 to filter out noises and stabilize output voltage $V_{OUT}$.

In some examples, power supply system 100 may include control circuitry 106 to control operations of LDO regulator 102 and DC/DC regulator 104. In some examples, control circuitry 106 may receive feedback signal 112 representative of output voltage $V_{OUT}$ to load 108. As described in more detail below, in some examples, control circuit 106 may include a voltage control circuit that may generate control signals for LDO regulator 102 and DC/DC regulator 104, respectively, based on feedback signal 112 to control operations of the voltage regulators such that they may regulate output voltage $V_{OUT}$ to a required value for load 108.

Additionally, in some examples, control circuitry 106 may include a first share control circuit and a second share control circuit. The first and second share control circuits may generate control signals respectively to control the load current sharing of LDO regulator 102 and DC/DC regulator 104. For example, in some examples, power supply system 100 may be controlled such that DC/DC regulator 104 may be operated as a primary voltage regulator whereas LDO regulator 102 may be operated as a secondary voltage regulator. When load current $I_{load}$ is below a threshold value, power supply system 100 may primarily use DC/DC regulator 104 to provide the load current to load 108. In some examples, DC/DC regulator 104 may provide the entire load current. As load current $I_{load}$ increases beyond the threshold value, LDO regulator 102 may take more active load sharing roles by providing an increasing amount of current ($I_{load2}$), where DC/DC regulator 104 may be operated to a maximum current level and the rest of the required load current may be provided by LDO regulator 102. In some examples, the parallel operation may provide better power efficiency at low load conditions and lower ripple at high load conditions than one single regulator.

Additionally, in some examples, control circuit 106 may include one or more saturation prevention circuits that may operate to prevent saturation of the aforementioned voltage regulation circuit, for example, when output voltage $V_{OUT}$ becomes too high or too low, e.g., due to variations of load 108. Prevention of the saturation may allow the voltage regulation circuit to avoid losing controllability such that it may continuously regulate the output voltage. Moreover, to further improve performance, in some examples, some or all of the saturation prevention circuits may include a delay circuit to delay the "activation" of the saturation prevention circuits to avoid nuisance activation caused by ripples of the output voltage.

Note that in FIG. 1, for purposes of illustration, the above described control signals for LDO regulator 102 and DC/DC regulator 104 are collectively labeled as control signals 114 and 116. Further, FIG. 1 is a non-limiting example provided only for purposes of illustration. In some examples, power supply system 100 may use other types of semiconductor devices, such as other types of MOSFETs, transistors, thyristors, etc. than those displayed in FIG. 1. Additionally, in some examples, some or all of power supply system 100 may be implemented using one or more integrated circuits. For examples, in some examples, LDO regulator 102, DC/DC regulator 104, and control circuitry 106 altogether may be integrated using one integrated circuit, which may further be coupled to load 108 and power source 110. Alternatively, in some examples, control circuitry 106 may be implemented using one integrated circuit, and LDO regulator 102 and DC/DC regulator 104 may be components external to the integrated circuit, which may further in coupled to load 108 and power source 110. Alternatively, in some examples, the entire power supply system 100, including LDO regulator 102, DC/DC regulator 104, control circuitry 106, and power source 110, may be on one single integrated circuit, which may further be coupled to load 108.

Figure 2A:
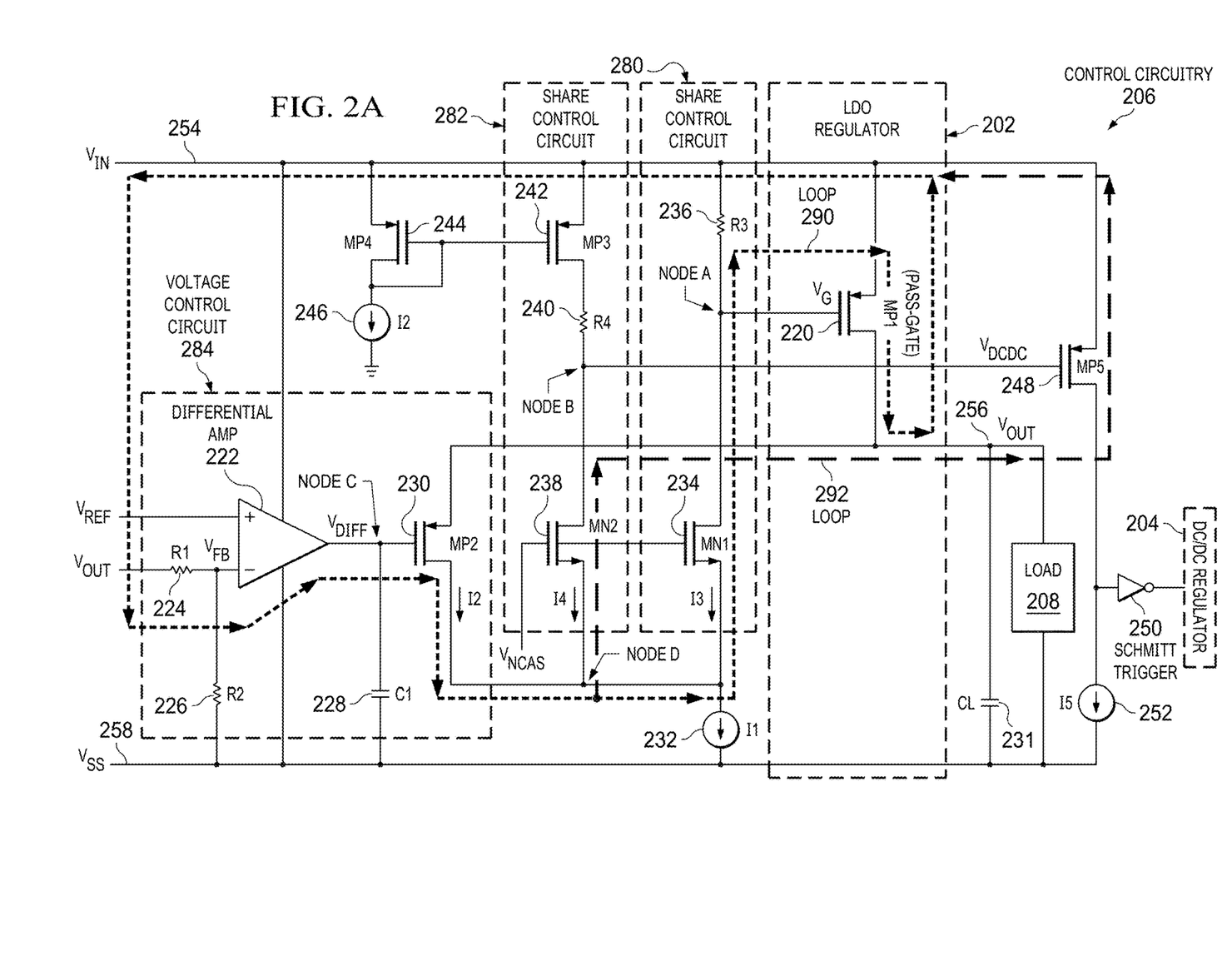
FIGS. 2A and 2B are block diagrams of control circuitry that may operate parallel-operating voltage regulators in accordance with some examples.

FIG. 2A is a block diagram of control circuitry that may operate parallel-operating voltage regulators in accordance with some examples. As shown, control circuitry 206 may be used to control operations of LDO regulator 202 and DC/DC regulator 204 that are coupled in parallel to regulate output voltage $V_{OUT}$ and provide a load current to load 208. As shown, LDO regulator 202 may include a semiconductor device, such as pFET MP1 220. MP1 220 may include a first current conduction terminal (e.g., source), a control terminal (e.g., gate), and a second current conduction terminal (e.g., drain). The first current conduction terminal of MP1 220 may be coupled to input terminal 254 to receive an input voltage Vin, and the second current conduction terminal of MP1 220 may be coupled to output terminal 256, which is further coupled to a first terminal of load 208. A second terminal of load 208 may be coupled to reference terminal 258, which is further coupled to a voltage reference such as ground. By controlling resistance of MP1 220 (e.g., further under control of control circuitry 206), LDO regulator 202 may adjust the voltage drop across MP1 220 so as to generate a regulated output voltage $V_{OUT}$ (from input voltage Vin) at terminal 256 to load 208. As described above, in some examples, load 208 may be load(s) of a variety of applications, for example, electronic components used in Bluetooth, BLE, IoT, or other types of wired or wireless communications.

To simplify illustration, detail of DC/DC regulator 204 is not shown in FIG. 2A, but in some examples, DC/DC regulator 204 may be substantially similar to DC/DC regulator 104 shown in FIG. 1. For example, DC/DC regulator 204 may be a buck converter, which may include one or more semiconductor device(s), such as pFET(s) and/or nFET(s), and an energy storage component, such as an inductor. DC/DC regulator 204 may be coupled in parallel with LDO 202 to regulate common output voltage $V_{OUT}$ based on common input voltage Vin. For example, DC/DC regulator 204 may receive input voltage Vin, and regulate output voltage $V_{OUT}$ by controlling switching of its semiconductor device(s). In some examples, DC/DC regulator 204 may operate in a discontinuous modulation mode (DCM) with pulse skipping modulation (PSM). DC/DC regulator 204 may have predetermined frequency shift modulation (FSM) and selectable peak current settings. Alternatively, DC/DC regulator 204 may operate in a continuous modulation mode (CCM). Additionally, as shown, in some examples, output filter capacitor CL 231 may be coupled to the first terminal of load 208 to filter out noises and smooth output voltage $V_{OUT}$ received by load 208.

In some examples, control circuitry 206 may include a first share control circuit 280, a second share control circuit 282, and a voltage control circuit 284. In some examples, share control circuit 280 and share control circuit 282 may operate together with voltage circuit 284 to control, respectively, operations of LDO regulator 202 and DC/DC regulator 204 to regulate output voltage $V_{OUT}$ to a required value as well as share the load current to load 208.

Referring to FIG. 2A, in some examples, share control circuit 280 may include resistor R3 236 and nFET MN1 234. MN1 234 may include a first current conduction terminal (e.g., drain), a control terminal (e.g., gate), and a second current conduction terminal (e.g., source). In some examples, R3 236 may be coupled in series with MN1 234. For example, as shown, a first terminal of R3 236 may be coupled to input terminal 254. A second terminal of R3 236 may be coupled to the first current conduction terminal of MN1 234. The second current conduction terminal of MN1 234 may be coupled to a first terminal of current source I1 232. A second terminal of current source 232 may be coupled to the reference terminal such as the ground. The control terminal of MN1 234 may be coupled to a control voltage $V_{NCAS}$, which may be a substantially constant voltage. In some examples, share control circuit 280 may include an output terminal (or node A) in-between R3 236 and MN1 234, e.g., at the second terminal of R3 236. Share control circuit 280 may generate a control signal at the output terminal (or node A), and the output terminal (or node A) may further be coupled to the control terminal of MP1 220 of LDO regulator 202. For example, as shown, with the electrical connection, the gate voltage VG of MP1 220 equals the voltage value of the control signal generated at the output terminal (or node A), and the source-to-gate voltage $V_{GS}$ of MP1 220 equals the voltage drop across R3 236. Thus, share control circuit 280 may control the voltage of R3 236, e.g., by controlling current I3 flowing through share control circuit 280, to adjust the source-to-gate voltage $V_{GS}$ of MP1 220, so as to control resistance of MP1 220 to regulate output voltage $V_{OUT}$ and the load current of LDO regulator 220.

Referring back to FIG. 2A, in some examples, share control circuit 282 may include resistor R4 240 and nFET MN2 238. Similar to MN1 234, MN2 238 may include a first current conduction terminal (e.g., drain), a control terminal (e.g., gate), and a second current conduction terminal (e.g., source). In the following description, to simplify illustration, unless pointed out particularly, by default, a first current conduction terminal of a nFET corresponds to the drain, a control terminal of the nFET corresponds to the gate, and a second current conduction terminal of the nFET corresponds to the source of the device. Additionally, a first current conduction terminal of a pFET corresponds to the source, a control terminal of the pFET corresponds to the gate, and a second current conduction terminal of the pFET corresponds to the drain of the device. As shown in FIG. 2A, in some examples, R4 240 may be coupled in series with MN2 238. For example, as shown, a first terminal of R4 240 may be coupled to input terminal 254. (Note that in this example, the first terminal of R4 240 is coupled to MP3 242, which is further coupled to input terminal 254.) A second terminal of R4 240 may be coupled to the first current conduction terminal of MN2 238. The second current conduct terminal of MN2 238 may be coupled to current source I1 232. The control terminal of MN2 238 may be coupled to the control voltage $V_{NCAS}$, or another voltage source providing a voltage of the same value. In some examples, share control circuit 282 may include an output terminal (or node B) at the second terminal of R4 240. Share control circuit 282 may generate a control signal at the output terminal (or node B), and the output terminal (or node B) may further be coupled to the control terminal of pFET MP5 248, which may further be coupled to the semiconductor device(s) of DC/DC regulator 204 (not shown) through Schmitt trigger 250. Similar to MP1 220 of share control circuit 280, the source-to-gate voltage $V_{GS}$ of MP5 248 equals the voltage drop across R4 240. Thus, share control circuit 282 may control the voltage of R4 240, e.g., by controlling current I4 flowing through share control circuit 282, to control operations of MP5 248 so as to control operations of DC/DC regulator 204.

Additionally, as shown, in some examples, share control circuit 282 may include pFET MP3 242. As described in detail below, MP3 242 may be part of a current mirror which may be used to limit the current through share control circuit 282 to a specified maximum value. This may improve the load current sharing between LDO regulator 202 and DC/DC regulator 204. For example, when the load current of load 208 is beyond a specified value, for example, at a high load condition, MP3 242 (together with the current mirror) may restrain DC/DC regulator 204 from further contributing load current, such that DC/DC regulator 204 may be limited to providing a maximum current value and the rest of the required load current of load 208 may be provided by LDO regulator 202.

Referring back to FIG. 2A, in some examples, voltage control circuit 284 may include a differential circuit, such as differential amplifier 222, and pFET MP2 230. Differential amplifier 222 may include a first input terminal, a second input terminal, and an output terminal. The first input terminal of differential amplifier 222 may receive a reference signal $V_{REF}$, and the second input terminal of differential amplifier 222 may receive a feedback signal $V_{FB}$. In some examples, the reference signal $V_{REF}$ may represent a target value of output voltage $V_{OUT}$, e.g., a voltage level that output voltage $V_{OUT}$ is required to be regulated to by LDO regulator 202 and DC/DC regulator 204. The reference signal $V_{REF}$ may be generated internally within the power supply system of control circuitry 206, or generated by an external component and provided to control circuitry 206. In some examples, the feedback signal $V_{FB}$ may represent the actual value of output voltage $V_{OUT}$. As shown, $V_{FB}$ may be generated from output voltage $V_{OUT}$, e.g., using a voltage divider formed by resistors R1 224 and R2 226. Based on the reference signal $V_{REF}$ (received at the first input terminal) and the feedback signal $V_{FB}$ (received at the second input terminal), differential amplifier 222 may generate an output signal $V_{DIFF}$, based on a difference between the two input signals, at the output terminal or node C. $V_{DIFF}$ may represent the difference between $V_{REF}$ and $V_{FB}$, such as ($V_{DIFF}$=GAIN×($V_{REF}$−$V_{FB}$)) where GAIN is a gain of differential amplifier 222.

As shown in FIG. 2A, in some examples, the control terminal of MP2 230 may be coupled to the output terminal of differential amplifier 222, the first current conduction terminal of MP2 230 may be coupled to output terminal 256 (or the output voltage $V_{OUT}$ to load 208), and the second current conduction terminal of MP2 230 may be coupled to current source I1 232. In some examples, share control circuit 280 and share control circuit 282 may operate together with voltage circuit 284 to respectively control operations of LDO regulator 202 and DC/DC regulator 204 to share the load current of load 208 while regulating output voltage $V_{OUT}$. In particular, through differential amplifier 222 and MP2 230, output voltage $V_{OUT}$ may operate as a "negative" feedback to control currents respectively flowing through share control circuits 280 and 282, so as to control the voltages across R3 236 and R4 240 to control MP1 220 of LDO regulator 202 and the semiconductor device(s) of DC/DC regulator 204 (not shown).

For example, consider an exemplary scenario where output voltage $V_{OUT}$ reduces from a target value due to an increase of the load current of load 208. As indicated by control loop 290 (the dotted line), the decrease of output voltage $V_{OUT}$ may cause an increase of $V_{DIFF}$ at the output terminal of differential amplifier 222 (that is also coupled to the control terminal of MP2 230). The increase of $V_{DIFF}$ at the control terminal of MP2 230 may cause a decrease of the current I2 flowing through MP2 230. Given that MN1 234 and MP2 230 are coupled to current source I1 232, the decrease of current I2 through MP2 230 may cause an increase to current I3 through share control circuit 280. In turn, the increase of current I3 through share control circuit 280 may cause a larger voltage drop across R3 236. As described above, the voltage of R3 236 may function as a control signal to control operations of LDO regulator 202. For example, an increase of the voltage of R3 236 may increase the source-to-gate voltage $V_{GS}$ of MP1 220, which may thus reduce resistance of MP1 220 and, in turn, increase output voltage $V_{OUT}$ to recover it back to the target value.

Similarly, as indicated by control loop 292 (the dashed line), the decrease of current I2 through MP2 230 (caused by decrease of output voltage $V_{OUT}$) may cause an increase to current I4 through share control circuit 282. In turn, it may increase the voltage across R4 240. The increase of the voltage of R4 240 may reduce resistance of MP5 248 to increase the current flowing through MP5 248. Given that MP5 248 is also coupled to current source I5 252, this may cause an increase to the voltage at the second current conduction terminal (e.g., the drain) of MP 5 248. This may increase the duty cycle of the semiconductor(s) of DC/DC regulator 204 to thus increase and recover output voltage $V_{OUT}$.

As described, the load current of load 208 may affect the value of output voltage $V_{OUT}$, which is further reflected to current I2 through MP2 230. Since MP2 230, MN1 234, and MN2 238 altogether are coupled to a constant current source I1 232, currents I3 and I4 through MN1 234 and MN2 238, or the sum of I3 and I4 (e.g., (I3+I4)=(I1−I2)), may be considered to include the load current information and thus represent the load current of load 208. In some examples, the gate-to-source voltage $V_{GS}$ of MN2 238 may be configured to be same as the gate-to-source voltage $V_{GS}$ of MN1 234, e.g., by coupling the control terminal of MN2 238 to the same control voltage $V_{NCAS}$ as MN1 234 and the second current conduction terminal of MN2 238 to the second current conduction terminal of MN1 234, as shown in FIG. 2A. Thus, current I4 through MN2 238 may be proportional to current I3 through MN1 234. Additionally, MN2 238 and MN1 234 may be configured to have different dimensions, for example, different ratios between the width (W) of a gate to the length (L) of the gate of a transistor (e.g., ratio=W/L). This may provide scaling between currents I3 and I4 through MN1 234 and MN2 238, e.g., (I4/I3=(W4/L4)/(W3/L3)) where W4/L4 is the dimension of MN2 238 and W3/L3 is the dimension of MN1 234. In some examples, the dimension of MN2 238 may be larger than the dimension of MN1 234, such that current I4 of MN2 238 may be larger than current I3 of MN1 234. In other words, MN2 238 may be considered to carry a larger portion, than MN1 234, of a current representative of the load current of load 208. As described above, since current I4 of MN2 238 flows through share control circuit 282, DC/DC regulator 204 may thus contribute a larger portion of the load current than LDO 202.

In some examples, the resistance of R4 240 may be configured to be larger than R3 236. As a result, a larger control signal, represented by the source-to-gate voltage $V_{GS}$ at node B of share control circuit 282, may be generated, than the control signal represented by the source-to-gate voltage $V_{GS}$ generated at node A of share control circuit 280. This may further increase the scaling and thus load sharing of DC/DC regulator 204 over LDO regulator 202. In summary, with the above described electrical connection between MN1 234 and MN2 238, different dimensions of MN1 234 and MN2 238, and/or different resistance of R3 236 and R4 240, DC/DC regulator 204 may be configured to share a larger portion of the load current (e.g., as a primary regulator) than LDO regulator 202 (e.g., as a secondary regulator). In some examples, control circuitry 206 may be configured such that DC/DC regulator 204 may supply the entire current when the load current is below a specified value.

The disclosed control circuitry 206 may provide benefits over other designs. For examples, some designs may directly monitor the gate voltage and/or the gate-to-source voltage of the pass gate (e.g., MP1 220) of an LDO regulator to implement the load sharing between the LDO regulator and DC/DC regulator. However, this approach mingles the load estimation for the two regulators based on monitoring the same voltage, thus resulting in inaccurate load estimation. Additionally, operations of DC/DC regulator 204 may require a faster corresponding loop than LDO regulator 202. By comparison, control circuitry 206 may decouple the load estimation for LDO regulator 202 and DC/DC regulator 204 by having separate share control circuits 280 and 282 for the two regulators respectively. This may increase load estimation accuracy and also enable control loop 292 of DC/DC regulator 204 to operate faster, thus providing better control performance of the output voltage and load sharing. Further, when load 208 is suddenly applied or increase, control loops 290 and 292 of LDO regulator 202 and DC/DC regulator 204 may respond at or around the same time. This may improve transients of output voltage $V_{OUT}$ by reducing transient dips. Once the output voltage settles to a stable value, LDO regulator 202 and DC/DC regulator 204 may share the load current according to operations described in the disclosure.

Referring back to FIG. 2A, in some examples, share control circuit 282 may further include pFET MP3 242, which may be part of a current mirror. As shown, the first current conduction terminal of MP3 242 may be coupled to input terminal 254. The second current terminal of MP3 242 may be coupled to the first terminal of R4 240. Additionally, the control terminal of MP3 242 may be coupled to the control terminal of pFET MP4 244, two of which may further be coupled to current source I2 246. The first current conduction terminal of MP4 244 may be coupled to input terminal 254, and the second current conduction terminal of MP4 244 may be coupled to current source I2 246 (which is also coupled to the control terminals of MP4 244 and MP3 242). MP3 242, MP4 244, and current source I2 246 may form a current mirror, which may limit current I4 flowing through MP3 242 (and the rest of share control circuit 282) up to current I2 of current source 246. In some examples, current I2 may be configured to have a value of a few microamperes (μA), e.g., 3 μA. As a result, this may limit the load current sharing of DC/DC regulator 204, e.g., to a specified maximum value (corresponding to 3 μA, for example), and the rest of the required load current may be provided by LDO regulator 202. In some examples, addition of MP3 242 may also increase the equivalent resistance seen from the second current conduction terminal (e.g., the source) of MN2 238. This may prevent reduction of the gain of the loop formed by MN1 234, R3 236, MP1 220, and MP2 230.

In summary, when the load current of load 208 is below a threshold value, e.g., at low load (or low load current) conditions, control circuit 206 may operate DC/DC regulator 204 as a primary regulator to provide most of the load current. In some examples, DC/DC regulator 204 may provide the entire load current, and LDO regulator 202 may be completely off. This may allow the voltage regulators to operate at high power efficiency. As the load current of load 208 increases beyond the threshold value, e.g., at high load (or high load current) conditions, both DC/DC regulator 204 and LDO regulator 202 may be used to collectively provide the load current. DC/DC regulator 204 may be limited to provide a specified maximum amount of current, and LDO regulator 202 may provide the extra required current. The threshold value may be specified, e.g., during a design phase, by configuration and value selection of the components of control circuitry 206. Circuitry 206 may ensure seamless load sharing between LDO regulator 202 and DC/DC regulator 204 as the load current increases.

Figure 2B:
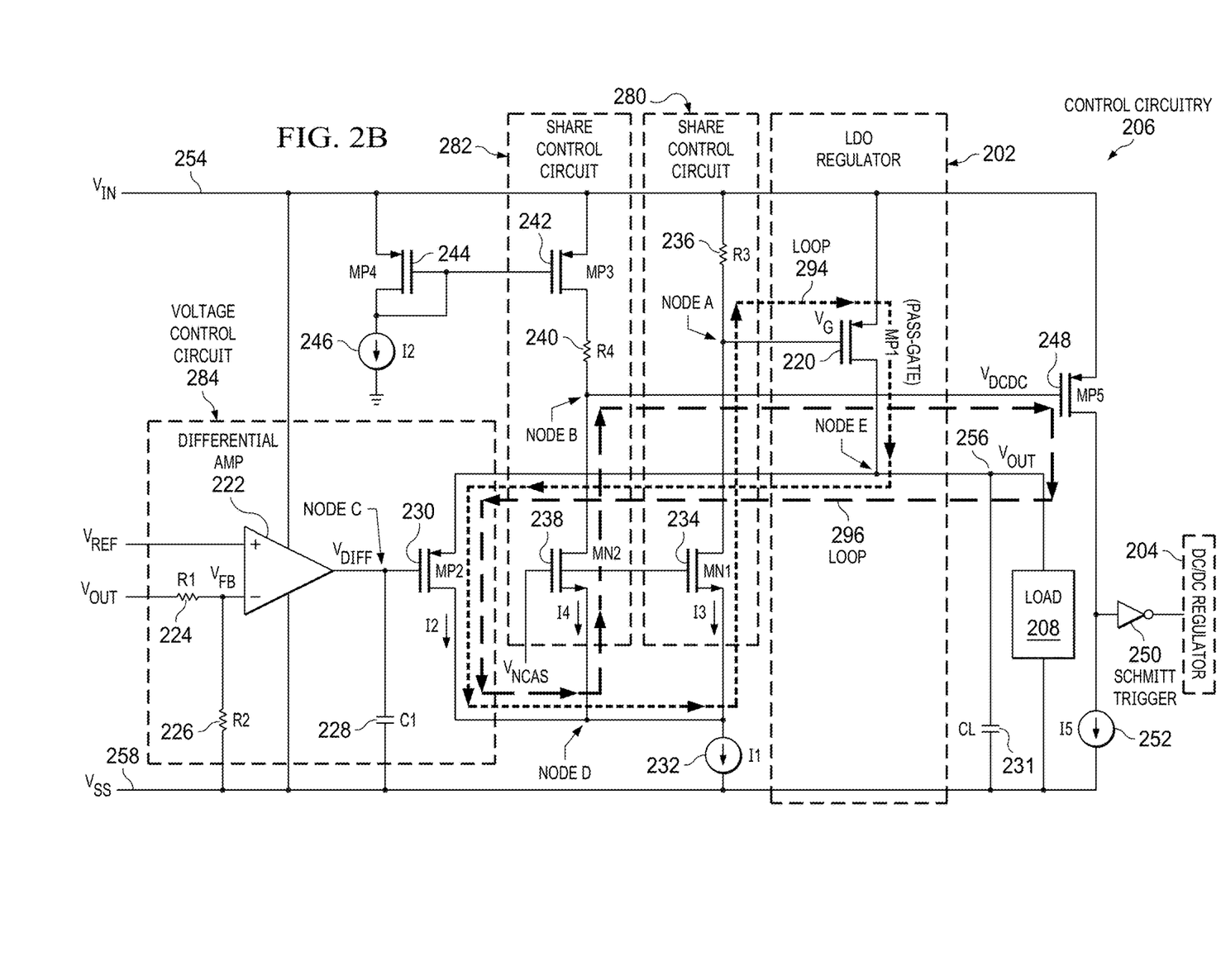

In addition to the above described voltage regulation loops, e.g., implemented by voltage control circuit 284 together with share control circuits 280 and 282, control circuitry 206 may include relatively faster control loops for the voltage regulation by LDO regulator 202 and DC/DC regulator 204. For purposes of illustration, FIG. 2A is reproduced in FIG. 2B, except that the dotted and dashed lines indicating control loops 290 and 292 are removed. Instead, FIG. 2B shows two different control loops 294 (the dotted line) and 296 (the dashed line) for LDO regulator 202 and DC/DC regulator 204. As shown, control loop 294 may go through MP1 220, MP2 230, and MN1 234, and control loop 296 may go through MP5 248, MP2 230, and MN2 238. Operations of control loops 296 and 296 may be similar to what are described above with respect to the output voltage regulation, except that they may not necessarily involve differential amplifier 222. For example, reduction of the output voltage $V_{OUT}$ (from a target value) may cause a decrease to current I2 of MP2 230, which may in turn increase current I3 through MN1 234 and current I4 through MN2 238. Increase of currents I3 and I4, respectively, may increase the control signals (generated at node A and node B, respectively) for LDO regulator 202 and DC/DC regulator 204, which may in turn increase the output voltage $V_{OUT}$ back to the target regulation voltage. In some examples, control loops 290 and 292 of FIG. 2A may have relatively higher loop gains than control loops 294 and 296, respectively, and accordingly they may have relatively slower response than control loops 294 and 296. Thus, control loops 290 and 292 may regulate the output voltage $V_{OUT}$ to a substantially stable target value, whereas control loops 294 and 296 may correct transients of the output voltage $V_{OUT}$ for sudden load current changes.

Figure 3:
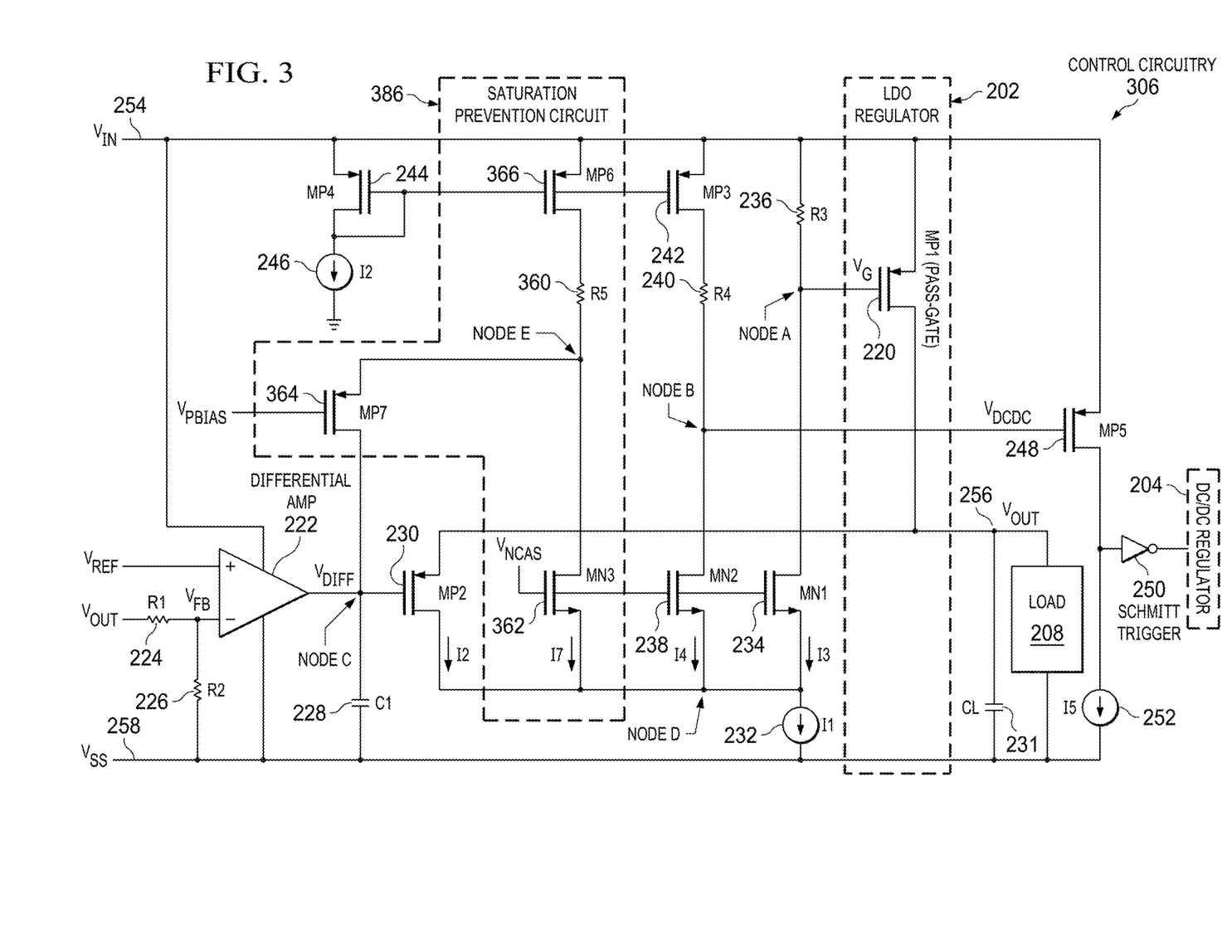
FIG. 3 is a block diagram of control circuitry that may operate parallel-operating voltage regulators in accordance with some examples.

FIG. 3 is a block diagram of control circuitry that may operate parallel-operating voltage regulators in accordance with some examples. As shown, control circuitry 306 may be similar to control circuitry 206 of FIG. 2A, except that control circuitry 306 may include saturation prevention circuit 386. In some examples, saturation prevention circuit 386 may prevent saturation of differential amplifier 222, such that voltage regulation circuit 284 may continuously operate together with share control circuits 280 and 282 to regulate the output voltage $V_{OUT}$ of load 208. For example, when the load current of load 208 suddenly decreases, this may cause an overshoot to the output voltage $V_{OUT}$. This may cause the output signal $V_{DIFF}$ of differential amplifier 222 to a negative limit, e.g., to the ground voltage, especially if the overshoot is not corrected timely and stays for a long time. As a result, control circuitry may lose, at least temporarily, controllability such that the overshoot of the output voltage $V_{OUT}$ may not be able to be correctly regulated. In some examples, this may further cause damages to load 208.

As shown, in some examples, saturation prevention circuit 386 may include resistor R5 360, pFET MP7 364, and nFET MN3 362. A first terminal of R5 360 may be coupled to input terminal 254. (Note that in this example R5 360 is coupled to pFET MP6 366, which is further coupled to input terminal 254.) A second terminal of R5 360 may be coupled to a first current conduction terminal of MP7 364 and a first current conduction terminal of MN3 362. A second current conduction terminal of MP7 364 may be coupled to the output terminal of differential amplifier 222 (e.g., to $V_{DIFF}$). A control terminal of MP7 364 may be coupled to control voltage $V_{PBIAS}$, which may be a substantially constant voltage. A second current conduction terminal of MN3 362 may be coupled to current source i1 232, and a control terminal of MN3 362 may be coupled to control voltage $V_{NCAS}$, or another voltage source providing voltage of the same value.

As described above, saturation prevention circuit 386 may prevent saturation of differential amplifier 222, especially saturation towards a negative limit. For example, consider an exemplary scenario when the load current of load 208 reduces to cause an overshoot of the output voltage $V_{OUT}$. The overshoot may cause the output signal $V_{DIFF}$ of differential amplifier 222 towards a negative limit, e.g., to the ground voltage. Since $V_{DIFF}$ is also coupled to the control gate of MP2 230, the decrease of $V_{DIFF}$ may cause an increase of current I2 through MP2 230. Since MN3 362 is configured to have the same gate-to-source voltage $V_{GS}$ as MN1 234 and MN2 238, the increase of current I2 may cause a decrease to current I7 through saturation prevention circuit 386. The decrease of current I7 may further reduce the voltage drop across R5 360 to thus increase the voltage at node E. Given that the control terminal of MP7 364 is coupled to a constant voltage $V_{PBIAS}$, the increase of the voltage at node E may increase the source-to-gate voltage $V_{GS}$ of MP7 364. Normally MP7 364 may stay at OFF state. The increase of $V_{GS}$ of MP7 364 may turn on MP7 364 to thus activate saturation prevention 386 and couple the output terminal of differential amplifier 222 to node E. This may cause more current to flow into the output terminal of differential amplifier 222, pull up $V_{DIFF}$ at the output terminal of differential amplifier 222 out of the negative limit, and thus remove the saturation.

As shown, in some examples, saturation prevention circuit 386 may further include pFET MP6 366, which may be part of a current mirror. A first current conduction terminal of MP6 366 may be coupled to input terminal 254, and a second current conduction terminal of MP6 366 may be coupled to the first terminal of R5 360. A control terminal of MP6 366 may be coupled to the control terminal of MP3 242 (and the control terminal of MP4 244, the second current conduction terminal of MP4 244, and current source I2 246). In some examples, MP6 366 (together with the current mirror) may limit the current through R5 360 to a specified maximum value, e.g., 3 µA of current source I2 246. Additionally, in some examples, R5 360 may be configured to provide a high scaling factor for the current through R5 360 compared to current I3 through R3 236, e.g., by selecting the resistance of R5 360 to be larger than R3 236. In some examples, addition of MP6 366 may also increase the equivalent resistance seen from the second current conduction terminal (e.g., the source) of MN3 362. This may prevent reduction of a gain of the loop including MP6 366, R5 360, and MN3 362.

Figure 4:
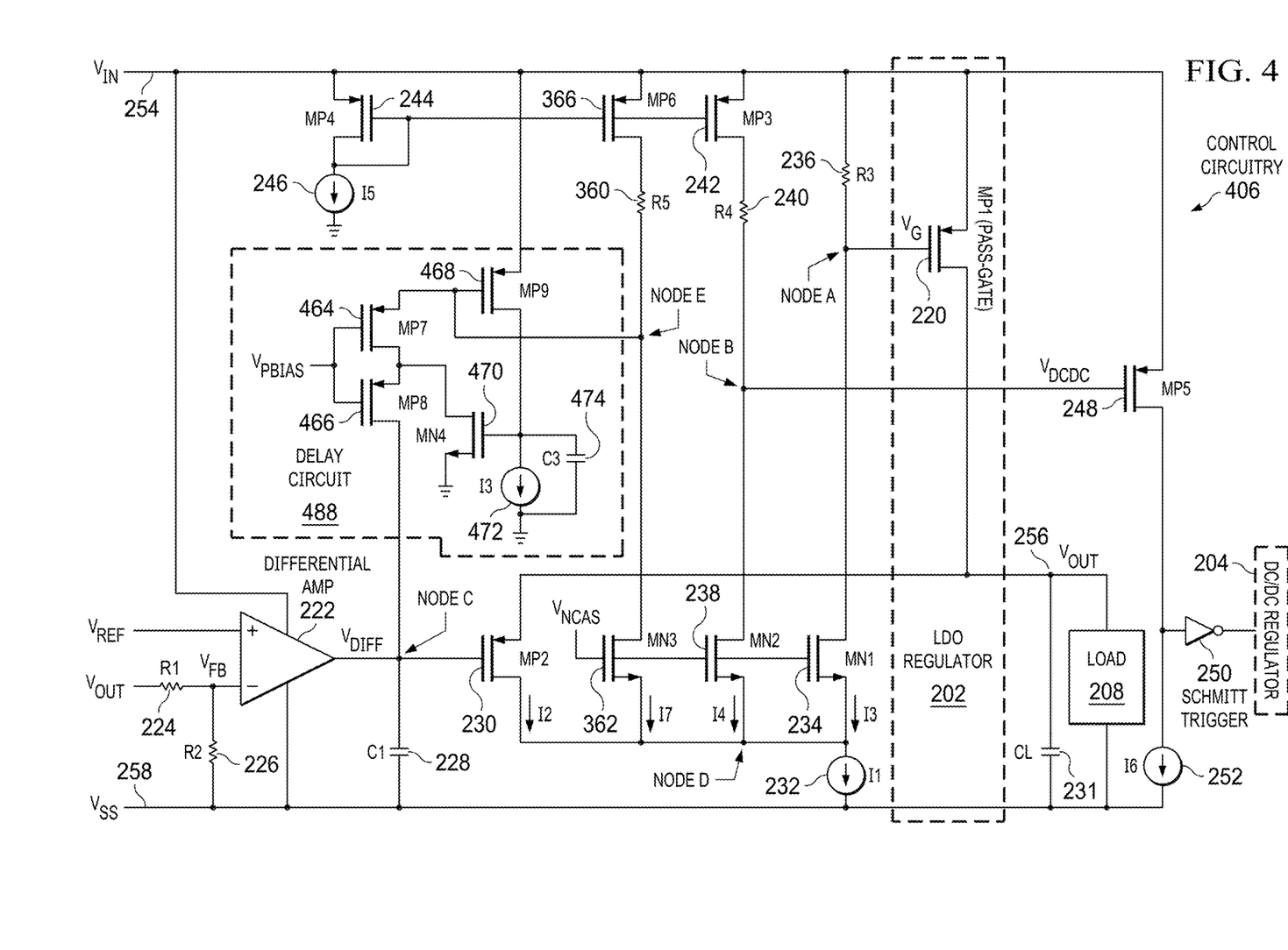
FIG. 4 is a block diagram of control circuitry that may operate parallel-operating voltage regulators in accordance with some examples.

FIG. 4 is a block diagram of control circuitry that may operate parallel-operating voltage regulators in accordance with some examples. As shown, control circuitry 406 may be similar to control circuitry 306 of FIG. 3, except that control circuitry 406 may include delay circuit 488. In some examples, delay circuit 488 may create a delay to the above described saturation prevention circuit. This may avoid nuisance activation of the saturation prevention circuit, e.g., caused by ripples of the output voltage $V_{OUT}$.

As shown, instead of coupling node E to the output voltage of differential amplifier 222 through MP7 364 (as shown in FIG. 3), the saturation prevention circuit in FIG. 4 may couple node E and the output terminal of differential amplifier 222 through pFET MP7 464 and pFET MP8 466. Further, delay circuit 488 may include pFET MP9 468, nFET MN4 470, and current source I3 472. A first current conduction terminal of MP9 468 may be coupled to input terminal 254, and a second current conduction terminal of MP9 468 may be coupled to a first terminal of current source I3 472. A second terminal of current source I3 472 may be coupled to a voltage source such as ground. A control terminal of MP9 468 may be coupled to a first current conduction terminal of MP7 464 and node E. A second current conduction terminal of MP7 464 may be coupled to a first current conduction terminal of MP8 466. A second current conduction terminal of MP8 466 may be coupled to the output terminal of differential amplifier 222. Control terminals of MP7 464 and MP8 466 may be coupled to control voltage $V_{PBIAS}$. The second current conduction terminal of MP7 464 and the first current conduction terminal of MP8 466 may be coupled to a first current conduction terminal of MN4 470. A second current conduction terminal of MN4 470 may be coupled to a voltage source such as ground. A control terminal of MN4 470 may be coupled to the second current conduction terminal of MP9 468 and current source I3 472. In some examples, capacitor C3 474 may be coupled in parallel with current source I3 472, as shown in FIG. 4.

Again, consider the exemplary scenario that an overshoot occurs to the output voltage $V_{OUT}$, e.g., caused by reduction of the load current of load 208. The overshoot may cause $V_{DIFF}$ of differential amplifier 222 to a negative limit, such as the ground voltage. Decrease of $V_{DIFF}$ may increase current I2 through MP2, which may decrease current I7 through MN3 362. The decrease of current I7 may increase the voltage at node E. The increase of the voltage at node E may turn on MP7 464 and MP8 466 to couple the output terminal of differential amplifier 222 to node E to thus cause more current to flow into the output terminal of differential amplifier 222, pull up $V_{DIFF}$ out of the negative limit, and remove the saturation. In some examples, MP9 468, MN4 470, current source I3 472, and C3 474 may implement filtering on the voltage of node E. They may effectively create a delay to activation of MP7 464 and MP8 466 by the voltage of node E. In some examples, the delay be configured to be a few microseconds, e.g., 4 µS. The delay may reduce sensitivity of the saturation prevention circuit to ripples of the output voltage $V_{OUT}$.

Figure 5:
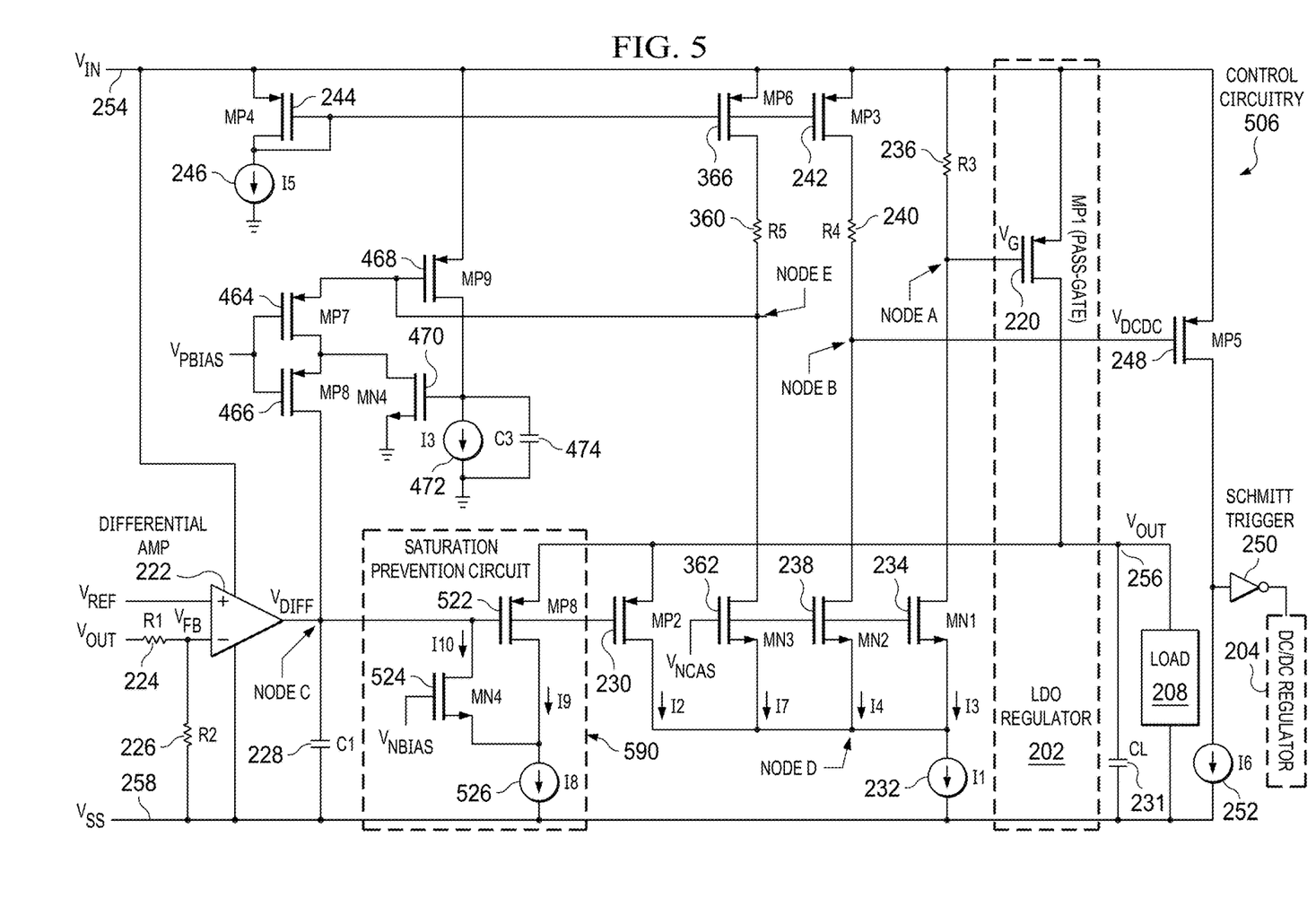
FIG. 5 is a block diagram of control circuitry that may operate parallel-operating voltage regulators in accordance with some examples.

FIG. 5 is a block diagram of control circuitry that may operate parallel-operating voltage regulators in accordance with some examples. As shown, control circuitry 506 may be similar to control circuitry 406 of FIG. 4, except that control circuitry 506 may include saturation prevention circuit 590. In some examples, saturation prevention circuit 590 may be used to prevent saturation of differential amplifier 222 towards a positive limit, to the supply voltage of differential amplifier 222. For purposes of illustration, the saturation prevention circuits 386 and 488 described in the previous figures are also called upper saturation prevention circuits, whereas saturation prevention circuit 590 is also called lower saturation prevention circuit.

As shown, saturation prevention circuit 590 may include pFET MP8 522, nFET MN4 524, and current source I8 526. A first current conduction terminal of MP8 522 may be coupled to output terminal 256 (or the output voltage $V_{OUT}$). A control terminal of MP8 522 may be coupled to the output terminal of differential amplifier 222 (or $V_{DIFF}$), and a first current conduction terminal of MN4 524. A second current conduction terminal of MP8 590 may be coupled to a first terminal of current source I8 526. A second terminal of current source 526 may be coupled to a voltage reference such as the ground. A control terminal of MN4 524 may be coupled to control voltage $V_{NBIAS}$. A second current conduction terminal of Mn4 524 may be coupled to current source I8 526.

Consider an exemplary scenario that the load current of load 208 may increase to reduce the output voltage $V_{OUT}$. The decrease of $V_{OUT}$ may cause an increase to $V_{DIFF}$ at the output terminal of differential amplifier 222. Sometimes, the decrease of $V_{OUT}$ may be too high and/or too long such that $V_{DIFF}$ may increase to a positive limit of differential amplifier 222, e.g., to the supply voltage of differential amplifier 222. The increase of $V_{DIFF}$ may reduce the source-to-gate voltage $V_{GS}$ to MP2 230. The decrease of $V_{GS}$ of MP2 230 may reduce current I2 through MP2 230, thus increase current I7 through R5 360, which may reduce the voltage at node E. The decrease of the voltage at node E may reduce the current flowing through an upper saturation prevention circuit (e.g., saturation prevention circuit 386 or 488 described above) into the output terminal of differential amplifier 222. Eventually, it may deactivate the upper saturation prevention circuit (e.g., by turning off MP7 364 or MP7 464 and MP8 466).

On the other hand, the above described increase of $V_{DIFF}$ may also reduce the source-to-gate voltage $V_{GS}$ to MP8 522. The decrease of $V_{GS}$ of MP8 522 may cause a decrease to current I9 through MP8 522. Given that MP8 522 and MN4 524 are coupled to current source I8 526, the decrease of current I9 may pull down the voltage at the second current conduction terminal (e.g., the source) of MN4 524, turn on MN4 524, and cause an increase to current I10 through MN4 524. Current I10 may increase the current flowing out of the output terminal of differential amplifier 522, pull down $V_{DIFF}$ from the positive limit, and remove the saturation.

Figure 6:
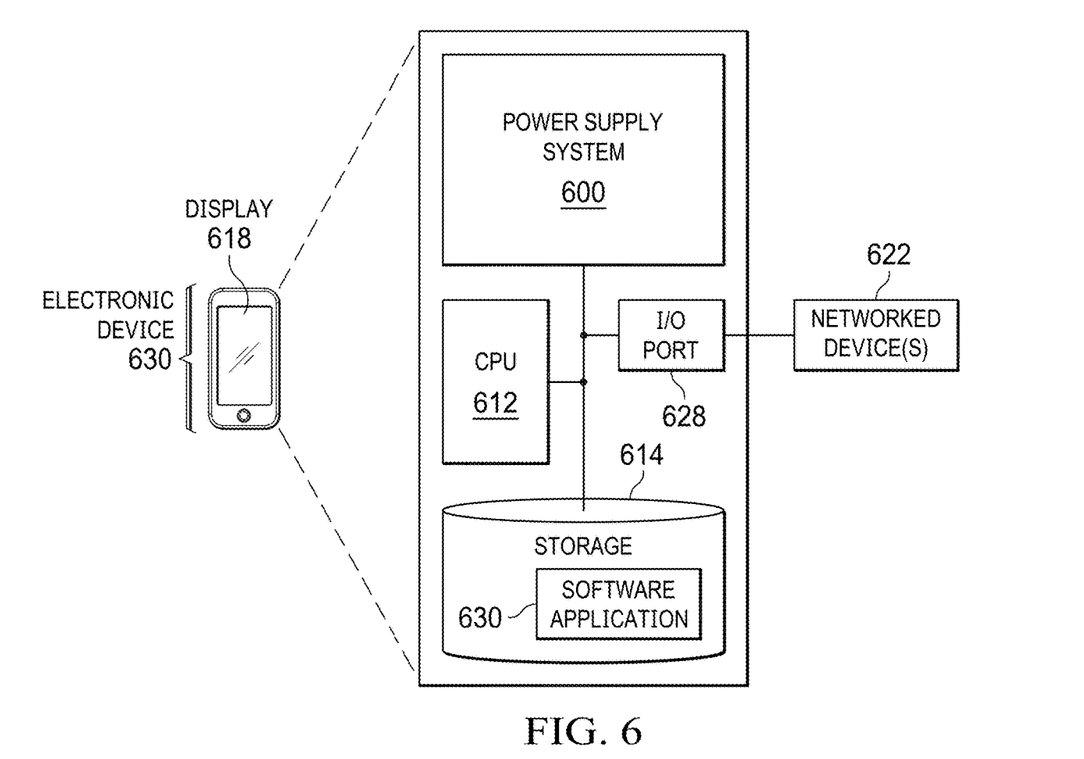
FIG. 6 is a block diagram of an electronic device that includes a power supply system having the above described parallel-operating voltage regulators and control circuitry in accordance with some examples.

FIG. 6 is a block diagram of an electronic device that includes a power supply system having the above described parallel-operating voltage regulators and control circuitry in accordance with some examples. As shown, electronic device 630 may include power supply system 600, central processing unit (CPU) 612, storage 614 (e.g., a random-access memory (RAM)), display 618, and input-output (I/O) port 628. In some examples, power supply system 600 may include above described parallel-operating voltage regulators and control circuitry to operate the parallel-operating voltage regulators. For example, in some examples, power supply system 600 may include an LDO regulator (e.g., one similar to the LDO regulators described above in FIGS. 1-5) coupled in parallel with a DC/DC regulator (e.g., one similar to the DC/DC regulators described above) or another LDO regulator. Additionally, power supply system 600 may include control circuitry (e.g., one similar to the control circuitry described above) to operate the parallel-operating voltage regulators. In some examples, the control circuitry may control operations of the parallel-operating voltage regulators to generate a regulated output voltage from an input voltage (e.g., one from a power source such as a battery) to supply the load(s), such as one or more of the components (e.g., CPU 612, storage 614, display 618, I/O port 628, etc.) of electronic device 630.

In some examples, CPU 612 may be a CISC-type (Complex Instruction Set Computer) CPU, RISC-type CPU (Reduced Instruction Set Computer), MCU-type (Microcontroller Unit), or a digital signal processor (DSP). CPU 612 comprises one or more processors. The one or more processors may be arranged to execute code for transforming the one or more processors into a special-purpose machine or for improving the functions of other components in electronic device 630 to provide a desired output without performing similar operations as the one or more processors. CPU 612 may comprise memory and logic that store information frequently accessed from storage 614.

In some examples, storage 614 may be memory such as an on-processor cache, off-processor cache, RAM, flash memory, or disk storage for storing one or more software applications 630. In some examples, a user interface of electronic device 630 may be displayed on display 618. A user may operate electronic device 630 to implement various functions and/or features through the user interface. In some examples, electronic device 630 may include one or more sensors and/or devices (not shown), e.g., camera(s), speaker, microphone, etc., to enhance the interaction between the user and electronic device 630.

In some examples, I/O port 628 may provide an interface that is configured to receive input from (and/or provide output to) networked device(s) 622. Networked device(s) 622 can include any device capable of wired or wireless communications, including Bluetooth and BLE, with computing device 630. In some examples, network device(s) 622 may be IOT device(s). In some examples, electronic device 630 may be able to be coupled to peripherals and/or other computing devices, including tangible, non-transitory media (such as flash memory), and/or cabled or wireless media. These and other input and output devices may be selectively coupled to electronic device 630 by external devices using wired or wireless connections.

The above examples are non-limiting examples to illustrate several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims. For examples, in some examples, control circuitry may be implemented to include some or all of the features of one of the control circuitries described above in FIGS. 1-6 to operate parallel-operating regulators. In some examples, a power supply system may use other types of semiconductor devices, such as other types of MOSFETs, transistors, thyristors, etc. than those displayed in those examples.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B. As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

What is claimed is:

1. A system, comprising:
an input terminal configured to receive an input voltage;
a first output terminal configured to provide a first control signal for a first voltage regulator;
a second output terminal configured to provide a second control signal for a second voltage regulator;
a first share control circuit configured to generate the first control signal, comprising:
  a first resistor having a first terminal and a second terminal, the first terminal coupled to the input terminal, the second terminal coupled to the first output terminal;
  a first transistor having a first terminal, a second terminal, and a third terminal, the first terminal coupled to the second terminal of the first resistor, the second terminal configured to receive a first control voltage; and
  a first current source coupled to the third terminal of the first transistor; and
a second share control circuit configured to generate the second control signal, comprising:
  a second transistor having a first terminal, a second terminal, and a third terminal, the first terminal coupled to the input terminal;
  a second resistor having a first terminal and a second terminal, the first terminal coupled to the third terminal of the second transistor, the second terminal coupled to the second output terminal; and
  a third transistor having a first terminal, a second terminal, and a third terminal, the first terminal coupled to the second terminal of the second resistor, the second terminal configured to receive the first control voltage, the third terminal coupled to the first current source.

2. The system of claim 1, further comprising:
a fourth transistor having a first terminal, a second terminal, and a third terminal, the first terminal coupled to the input terminal, the second terminal coupled to the third terminal of the fourth transistor, the second terminal of the second transistor, and a second current source.

3. The system of claim 1, wherein resistance of the second resistor of the second share control circuit is larger than resistance of the first resistor of the first share control circuit.

4. The system of claim 1, further comprising:
a differential amplifier having a first input terminal, a second input terminal, and an output terminal, the first input terminal configured to receive a reference voltage, the second input terminal configured to receive a feedback voltage representing an output voltage to a load of the first and second voltage regulators; and
a fifth transistor having a first terminal, a second terminal, and a third terminal, the first terminal configured to receive the output voltage, the second terminal coupled to the output terminal of the differential amplifier, the third terminal coupled to the first current source.

5. The system of claim 4, further comprising:
a saturation prevention circuit, comprising:
  a sixth transistor having a first terminal, a second terminal, and a third terminal, the first terminal coupled to the input terminal, the second terminal coupled to the second terminal of the second transistor;
  a third resistor having a first terminal and a second terminal, the first terminal coupled to the third terminal of the sixth transistor;
  a seventh transistor having a first terminal, a second terminal, and a third terminal, the first terminal configured to receive the second terminal of the third resistor, the second terminal configured to receive the first control voltage, the third terminal coupled to the first current source; and
  an eighth transistor having a first terminal, a second terminal, and a third terminal, the first terminal coupled to the second terminal of the third resistor, the second terminal configured to receive a second control voltage, the third terminal coupled to the output terminal of the differential amplifier.

6. The system of claim 4, further comprising:
a saturation prevention circuit, comprising:
  a sixth transistor having a first terminal, a second terminal, and a third terminal, the first terminal coupled to the input terminal, the second terminal coupled to the second terminal of the second transistor;
  a third resistor having a first terminal and a second terminal, the first terminal coupled to the third terminal of the sixth transistor;
  a seventh transistor having a first terminal, a second terminal, and a third terminal, the first terminal coupled to the second terminal of the third resistor, the second terminal configured to receive the first control voltage, the third terminal coupled to the first current source; and
  a ninth transistor having a first terminal, a second terminal, and a third terminal, the first terminal coupled to the input terminal, the second terminal coupled to the second terminal of the third resistor, the third terminal coupled to a third current source;
  a tenth transistor having a first terminal, a second terminal, and a third terminal, the first terminal coupled to the second terminal of the ninth transistor, the second terminal configured to receive a third control voltage;
  an eleventh transistor having first terminal, a second terminal, and a third terminal, the first terminal coupled to the third terminal of the tenth transistor, the second terminal configured to receive the third control voltage, and the third terminal coupled to the output terminal of the differential amplifier;
  a twelfth transistor having a first terminal, a second terminal, and a third terminal, the first terminal coupled the third terminal of the tenth transistor, the second terminal coupled to the third terminal of the ninth transistor; and
  a capacitor coupled to the third terminal of the ninth transistor and coupled in parallel with the third current source.

7. The system of claim 4, further comprising:
a saturation prevention circuit, comprising:
  a thirteenth transistor having a first terminal, a second terminal, and a third terminal, the first terminal configured to receive the output voltage, the second terminal coupled to the output terminal of the differential amplifier, the third terminal coupled to a fourth current source; and a fourteenth transistor having a first terminal, a second terminal, and a third terminal, the first terminal coupled to the output terminal of the differential amplifier, the second terminal configured to receive a fourth control voltage, the third terminal coupled to the fourth current source.

8. The system of claim 1, wherein the first voltage regulator and second voltage regulator are coupled in parallel to a load.

9. The system of claim 1, wherein the first voltage regulator is a low dropout (LDO) voltage regulator, and wherein the second voltage regulator is a DC-to-DC (direct current-to-direct current) switching voltage regulator.

10. The system of claim 1, wherein:
the first transistor is an n-channel MOSFET (metal-oxide-semiconductor field-effect transistor), the first terminal is a drain of the first transistor, the second terminal is a gate of the first transistor, and the third terminal is a source of the first transistor;
the second transistor is a p-channel MOSFET, the first terminal is a source of the second transistor, the second terminal is a gate of the second transistor, and the third terminal is a drain of the second transistor; and
the third transistor is an n-channel MOSFET, the first terminal is a drain of the third transistor, the second terminal is a gate of the third transistor, and the third terminal is a source of the third transistor.

11. The system of claim 1, further comprising:
a fifteenth transistor having a first terminal, a second terminal, and a third terminal, the first terminal coupled to the input terminal, the second terminal coupled to the second output terminal to receive the second control signal, the third terminal coupled to a fourth current source; and
a Schmitt trigger having a first terminal and a second terminal, the first terminal coupled to the third terminal of the fifteenth transistor, the second terminal configured to receive the second voltage regulator.

12. A system, comprising:
an input terminal configured to receive an input voltage;
a first share control circuit configured to generate a first control signal at a first output terminal for a first voltage regulator, comprising:
a first resistor having a first terminal and a second terminal, the first terminal coupled to the input terminal, the second terminal coupled to the first output terminal; and
a first transistor having a first current conduction terminal, a control terminal, and a second current conduction terminal, the first current conduction terminal coupled to the second terminal of the first resistor, the control terminal configured to receive a first control voltage, the second current conduction terminal coupled to a first current source; and
a voltage control circuit, comprising:
a differential circuit having a first input terminal, a second input terminal, and an output terminal, the first input terminal configured to receive a reference voltage, the second input terminal configured to receive a feedback voltage representing an output voltage to a load of the first voltage regulator; and
a second transistor having a first current conduction terminal, a control terminal, and a second current conduction terminal, the first current conduction terminal configured to receive the output voltage, the control terminal coupled to the output terminal of the differential circuit, the second current conduction terminal coupled to the first current source; and
a first saturation prevention circuit, comprising:
a second resistor having a first terminal and a second terminal;
a third transistor having a first current conduction terminal, a control terminal, and a second current conduction terminal, the first current conduction terminal coupled to the second terminal of the second resistor, the control terminal configured to receive the first control voltage, the second current conduction terminal coupled to the first current source; and
a fourth transistor having a first current conduction terminal, a control terminal, and a second current conduction terminal, the first current conduction terminal coupled to the second terminal of the second resistor, the control terminal configured to receive a second control voltage, the second current conduction terminal coupled to the output terminal of the differential circuit.

13. The system of claim 12, wherein the first saturation prevention circuit further comprises a delay circuit that comprises:
a fifth transistor having a first current conduction terminal, a control terminal, and a second current conduction terminal, the first current conduction terminal coupled to the input terminal, the control terminal coupled to the second terminal of the second resistor, the second current conduction terminal coupled to a second current source;
a sixth transistor coupled between the fourth transistor and the output terminal of the differential circuit, the sixth transistor having a first current conduction terminal, a control terminal, and a second current conduction terminal, the first current conduction terminal coupled to the second current conduction terminal of the fourth transistor, the control terminal configured to receive the second control voltage, the second current conduction terminal coupled to the output terminal of the differential circuit;
a seventh transistor having first current conduction terminal, a control terminal, and a second current conduction terminal, the first current conduction terminal coupled to the first current conduction terminal of the sixth transistor, the control terminal coupled to the second current source; and
a capacitor coupled to the second current conduction terminal of the fifth transistor and coupled in parallel with the second current source.

14. The system of claim 12, further comprising:
a second share control circuit configured to generate a second control signal at a second output terminal for a second voltage regulator, comprising:
a current mirror circuit, comprising:
an eighth transistor having a first current conduction terminal, a control terminal, and a second current conduction terminal, the first terminal current conduction coupled to the input terminal; and
a ninth transistor having a first current conduction terminal, a control terminal, and a second current conduction terminal, the first terminal current conduction coupled to the input terminal, the control terminal coupled to the control terminal of the eighth transistor, the second current conduction terminal coupled to the control terminal of the eighth transistor, the control terminal of the ninth transistor, and a third current source; and a third resistor having a first terminal and a second terminal, the first terminal coupled to the second current conduction terminal of the eighth transistor, the second terminal coupled to the second output terminal; and a tenth transistor having a first current conduction terminal, a control terminal, and a second current conduction terminal, the first current conduction terminal coupled to the second terminal of the second resistor, the control terminal configured to receive the first control voltage, the second current conduction terminal coupled to the first current source.

15. The system of claim 14, wherein resistance of the third resistor of the second share control circuit is larger than resistance of the first resistor of the first share control circuit.

16. The system of claim 12, further comprising:
a second saturation prevention circuit, comprising:
an eleventh transistor having a first current conduction terminal, a control terminal, and a second current conduction terminal, the first current conduction terminal configured to receive the output voltage, the control terminal coupled to the output terminal of the differential circuit, the second current conduction terminal coupled to a fourth current source; and a twelfth transistor having a first current conduction terminal, a control terminal, and a second current conduction terminal, the first terminal current conduction coupled to the output terminal of the differential circuit, the control terminal configured to receive a third control voltage, the second current conduction terminal coupled to the fourth current source.

17. The system of claim 12, wherein:
the first voltage regulator is a low dropout (LDO) voltage regulator;
the first and third transistors are n-channel MOSFETs (metal-oxide-semiconductor field-effect transistors), the control terminals of the first and third transistors are respective gates of the n-channel MOSFETs, and the first and second current conduction terminals of the first and third transistors are respective drains and sources of the n-channel MOSFETs; and
the second and fourth transistors are p-channel MOSFETs, the control terminals of the second and fourth transistors are respective gates of the p-channel MOSFETs, and the first and second current conduction terminals of the second and fourth transistors are respective sources and drains of the p-channel MOSFETs.

18. A system, comprising:
an input terminal configured to receive an input voltage;
a first voltage regulator and a second voltage regulator coupled in parallel and configured to provide a load current to a load;
a first share control circuit configured to generate a first signal to control share of the load current by the first voltage regulator, comprising:
a first resistor and a first transistor that are coupled in series between the input terminal and a first current source, one terminal of the first resistor coupled to the input terminal, one terminal of the first transistor coupled to the first current source, a first output terminal located between the first resistor and the first transistor, and the first signal generated at the first output terminal based on a voltage across the first resistor; and a second share control circuit configured to generate a second signal to control share of the load current by the second voltage regulator, comprising:
a second resistor and a second transistor that are coupled in series between the input terminal and the first current source, one terminal of the second transistor coupled to the input terminal, one terminal of the second transistor coupled to the first current source, a second output terminal located between the second resistor and the second transistor, and the second signal generated at the second output terminal based on a voltage across the second resistor.

19. The system of claim 18, further comprising:
a voltage control circuit, comprising:
a differential circuit configured to generate an output signal based on a reference voltage and an output voltage to the load of the first and second voltage regulator; and
a fourth transistor coupled to the differential circuit, the first share control circuit, and the second share control circuit,
wherein the voltage control circuit is configured to control respective currents flowing through the first and second share control circuits based on the output signal of the differential circuit so as to control the first and second control signals.

20. The system of claim 19, wherein resistance of the second resistor is larger than resistance of the first resistor so as to cause the second voltage regulator to share a larger portion of the load current than the first voltage regulator.

* * * * *